US012785472B2

(12) United States Patent
Shibata et al.

(10) Patent No.: US 12,785,472 B2
(45) Date of Patent: Nov. 3, 2026

(54) ROTOR, ROTARY ELECTRICAL MACHINE, ELECTRIC COMPRESSOR, AND METHOD FOR PRODUCING ROTOR

(71) Applicant: MITSUBISHI HEAVY INDUSTRIES ENGINE & TURBOCHARGER, LTD., Sagamihara (JP)

(72) Inventors: Naomichi Shibata, Kanagawa (JP); Eigo Kato, Tokyo (JP); Wataru Yamada, Tokyo (JP); Hiroaki Yoshizawa, Kanagawa (JP); Makoto Ogawa, Kanagawa (JP); Takaaki Yoshizawa, Kanagawa (JP); Yuki Yakuwa, Kanagawa (JP); Katsuyuki Osako, Kanagawa (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 172 days.

(21) Appl. No.: 18/839,762

(22) PCT Filed: Feb. 25, 2022

(86) PCT No.: PCT/JP2022/008008
§ 371 (c)(1),
(2) Date: Aug. 20, 2024

(87) PCT Pub. No.: WO2023/162171
PCT Pub. Date: Aug. 31, 2023

(65) Prior Publication Data
US 2025/0167608 A1 May 22, 2025

(51) Int. Cl.
*H02K 1/27* (2022.01)
*H02K 1/2753* (2022.01)
(Continued)

(52) U.S. Cl.
CPC ........... *H02K 1/2753* (2013.01); *H02K 7/003* (2013.01); *H02K 15/035* (2025.01); *H02K 15/40* (2025.01)

(58) Field of Classification Search
CPC ........ H02K 1/27; H02K 7/003; H02K 15/035; H02K 15/40
(Continued)

(56) References Cited

U.S. PATENT DOCUMENTS 7,654,742 B2 * 2/2010 Nishimoto ............ F16C 33/107 384/114
2010/0247342 A1 * 9/2010 Shimizu .................. F01D 25/12 417/410.1
(Continued)

FOREIGN PATENT DOCUMENTS

JP 9-285049 A 10/1997
JP 2002-10543 A 1/2002
(Continued)

OTHER PUBLICATIONS

Written Opinion of the International Searching Authority for International Application No. PCT/JP2022/008008, dated Apr. 5, 2022, with English translation.

*Primary Examiner* — Rashad H Johnson
(74) *Attorney, Agent, or Firm* — Birch, Stewart, Kolasch & Birch, LLP

(57) ABSTRACT

In a rotating body, a rotating electric machine, an electric compressor, and a method of manufacturing a rotating body, a rotary shaft having a pair of flange portions provided at an interval in an axial direction, an iron core made of a magnet that has a cylindrical shape, is divided into a plurality of pieces in a circumferential direction, and is disposed between the pair of flange portions on an outer side of the rotary shaft in a radial direction, and a holding sleeve that has a cylindrical shape, is disposed on an outer side of the
(Continued)

iron core, and has one end portion and the other end portion in the axial direction fixed to outer peripheral portions of the pair of flange portions are provided.

13 Claims, 5 Drawing Sheets

(51) Int. Cl.
*H02K 7/00* (2006.01)
*H02K 15/035* (2025.01)
*H02K 15/40* (2025.01)

(58) Field of Classification Search
USPC .......................... 310/156.01, 156.08, 156.12
See application file for complete search history.

(56) References Cited

U.S. PATENT DOCUMENTS

2014/0125208 A1* 5/2014 Yamashita ............... H02K 1/28 310/90
2014/0147306 A1* 5/2014 Yamashita .............. F01D 15/10 417/410.1
2015/0233384 A1 8/2015 Thompson et al.
2016/0065018 A1 3/2016 Yoshida et al.
2016/0359382 A1* 12/2016 Uetsuji ................... F02B 39/10
2017/0204868 A1* 7/2017 Oshita ................... F16C 19/547
2018/0209330 A1* 7/2018 Ilzuka ...................... H02K 1/28
2018/0209436 A1* 7/2018 Iizuka ..................... F04D 29/04
2019/0055953 A1* 2/2019 Ozasa ................... F04D 29/053
2019/0055954 A1* 2/2019 Egawa .................. F04D 29/057
2019/0165629 A1* 5/2019 Ozasa ...................... H02K 1/30
2020/0182252 A1* 6/2020 Nakasuji ............... F04D 19/007
2020/0309139 A1* 10/2020 Fukushima ........... F04D 29/057
2020/0412185 A1* 12/2020 Yabe ........................ H02K 1/24
2021/0010536 A1* 1/2021 Yamasuso ............. F04D 29/051
2021/0207607 A1* 7/2021 Nagao ....................... F16D 3/10
2022/0021255 A1* 1/2022 Iijima ....................... F02C 3/02
2022/0099080 A1* 3/2022 Baba ................... F04B 39/0094
2023/0126883 A1* 4/2023 Luo ....................... F04D 29/042 417/410.1
2023/0193917 A1* 6/2023 Moon ..................... F04D 17/12 415/122.1
2023/0296048 A1* 9/2023 Hayashi .................... F02C 7/06 415/111
2024/0263638 A1* 8/2024 Nishimura .............. F04D 25/06
2025/0116277 A1* 4/2025 Kitamura .............. F04D 17/122
2025/0163935 A1* 5/2025 Kitamura ............ F04D 29/5806
2025/0167608 A1* 5/2025 Shibata ................... F04D 17/12
2025/0183756 A1* 6/2025 Shibata .................. H02K 7/083

FOREIGN PATENT DOCUMENTS

JP 2004-208489 A 7/2004
JP 2009-72036 A 4/2009
JP 2015-155696 A 8/2015
JP 2018-52218 A 4/2016
WO WO 2007/072536 A1 6/2007
WO WO 2019/150500 A1 8/2019

* cited by examiner

ROTOR, ROTARY ELECTRICAL MACHINE, ELECTRIC COMPRESSOR, AND METHOD FOR PRODUCING ROTOR

TECHNICAL FIELD

The present disclosure relates to a rotating body, a rotating electric machine, and an electric compressor.

BACKGROUND ART

For example, since a fuel cell requires air having a high pressure, a two-stage compression type electric compressor is applied. In order to achieve an increase in efficiency of the two-stage compression type electric compressor, an increase in speed is necessary. In a case where the electric compressor is of a centrifugal compression type, it is possible to design high-efficiency vanes, which allows an electric motor to be smaller and lighter. In general, an electric motor (motor) applied to an electric compressor is provided with a rotor to which a permanent magnet is applied, and transmits a rotational torque generated from the permanent magnet to a rotary shaft. However, when the rotor rotates, a centrifugal force acts on the permanent magnet, and there is a concern that the permanent magnet is damaged due to a tensile stress. Therefore, a holding sleeve is disposed on an outer side of the permanent magnet to prevent damage to the permanent magnet.

Examples of such an electric motor include an electric motor described in PTL 1 below. In the electric motor described in PTL 1, a permanent magnet is disposed on an outer peripheral surface of a rotary shaft, a reinforcing ring is disposed to tighten the permanent magnet, and the outer peripheral surface of the rotary shaft and an end surface of the reinforcing ring are connected to each other by welding using end plates.

CITATION LIST

Patent Literature

[PTL 1] Japanese Unexamined Patent Application Publication No. 2009-072036

SUMMARY OF INVENTION

Technical Problem

In an electric motor of the related art, first, one end plate having a ring shape is press-fitted to a rotary shaft, next, a permanent magnet having a cylindrical shape is inserted, and then, the other end plate having a ring shape is press-fitted. Then, a reinforcing ring is press-fitted to each of the end plates, so that the permanent magnet is held by the reinforcing ring. Thereafter, the rotary shaft and the end plate, and the end plate and the reinforcing ring are fixed by welding. Therefore, there is a problem in that the number of parts of constituent members such as the rotary shaft, the end plates, and the reinforcing ring increases and the assembly work of each constituent member becomes complicated.

The present disclosure is devised to solve the above-described problems, and an object of the present disclosure is to provide a rotating body, a rotating electric machine, an electric compressor, and a method of manufacturing a rotating body, which reduces the number of parts and simplifies the assembly work.

Solution to Problem

In order to achieve the above object, a rotating body of the present disclosure includes: a rotary shaft having a pair of flange portions provided at an interval in an axial direction; an iron core made of a magnet that has a cylindrical shape, that is divided into a plurality of pieces in a circumferential direction, and that is disposed between the pair of flange portions on an outer side of the rotary shaft in a radial direction; and a holding sleeve that has a cylindrical shape, is disposed on an outer side of the iron core, and has one end portion and the other end portion in the axial direction fixed to outer peripheral portions of the pair of flange portions.

In addition, a rotating electric machine of the present disclosure includes: a housing having a hollow shape; a stator that has a cylindrical shape and that is fixed to an inner peripheral surface of the housing; and the rotating body that is rotatably supported by the housing such that the rotor having the iron core faces an inner peripheral surface of the stator with a gap therebetween.

In addition, an electric compressor of the present disclosure includes: the rotating electric machine; a low-pressure wheel that is fixed to one side of the rotary shaft in the axial direction; and a high-pressure wheel that is fixed to the other side of the rotary shaft in the axial direction.

In addition, a method of manufacturing a rotating body of the present disclosure includes: a step of forming an iron core having a cylindrical shape by assembling a plurality of divided iron core divided in a circumferential direction, between a pair of flange portions provided at an interval in an axial direction of a rotary shaft from an outer side in a radial direction; and a step of inserting a holding sleeve having a cylindrical shape from one side in the axial direction of the rotary shaft, disposing the holding sleeve on an outer side of the iron core, and fixing the holding sleeve to outer peripheral portions of the pair of flange portions.

Advantageous Effects of Invention

According to the rotating body, the rotating electric machine, the electric compressor, and the method of manufacturing a rotating body, it is possible to reduce the number of parts and to simplify the assembly work.

DESCRIPTION OF EMBODIMENTS

Hereinafter, a preferred embodiment of the present disclosure will be described in detail with reference to the drawings. The present disclosure is not limited to the embodiment. In addition, in a case where there are a plurality of embodiments, the present disclosure also includes configurations obtained by combining each embodiment. In addition, constituents in the embodiment include constituents that are easily perceivable by those skilled in the art, constituents that are substantially the same, and constituents within a so-called range of equivalents.

In the present embodiment, a rotating body is applied to an rotating electric machine, and the rotating electric machine (motor) is applied to an electric compressor. However, the present embodiment is not limited to this configuration, and the rotating body may be applied to a general electric motor as a rotating electric machine.

<Configuration of Electric Compressor>

Figure 1:
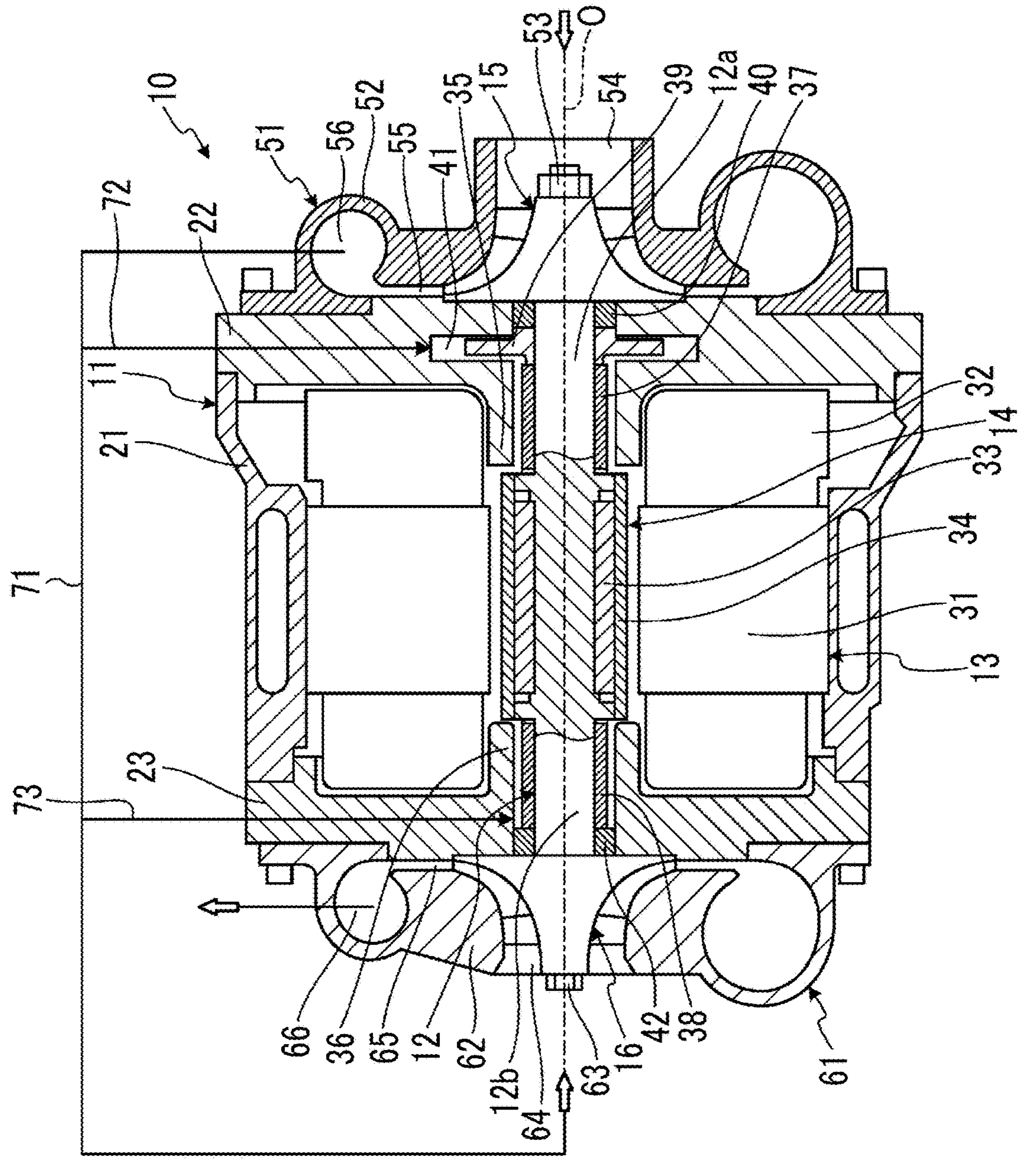
FIG. 1 is a longitudinal sectional view showing an internal configuration of an electric compressor according to the present embodiment.

FIG. 1 is a longitudinal sectional view showing an internal configuration of an electric compressor of a first embodiment.

As shown in FIG. 1, an electric compressor 10 includes a housing 11, a rotary shaft 12, a stator 13, a rotor 14, a low-pressure wheel 15, and a high-pressure wheel 16. The rotating body is constituted by the rotary shaft 12 and the rotor 14. The rotating electric machine is constituted by the housing 11, the rotary shaft 12, the stator 13, and the rotor 14.

The housing 11 has a motor housing 21, a low-pressure side bearing housing 22, and a high-pressure side bearing housing 23. The motor housing 21 has a cylindrical shape, and has an increased diameter at an end portion on one side in an axial direction (right side in FIG. 1). The low-pressure side bearing housing 22 has a disk shape and is disposed on one side in the axial direction in the motor housing 21. The low-pressure side bearing housing 22 is detachably fastened to the end portion of the motor housing 21 on one side in the axial direction by a plurality of bolts. The high-pressure side bearing housing 23 has a disk shape and is disposed on the other side in the axial direction in the motor housing 21. The high-pressure side bearing housing 23 is detachably fastened to an end portion of the motor housing 21 on the other side in the axial direction by a plurality of bolts.

In the motor housing 21 having a cylindrical shape, one opening in the axial direction is closed by the low-pressure side bearing housing 22, and the other opening in the axial direction is closed by the high-pressure side bearing housing 23. Therefore, the housing 11 has a hollow shape by fastening the low-pressure side bearing housing 22 and the high-pressure side bearing housing 23 to the motor housing 21.

The stator 13 is fixed to an inner peripheral portion of the motor housing 21. The stator 13 has a cylindrical shape. The stator 13 has a stator iron core 31 and a stator coil 32. The stator iron core 31 has a cylindrical shape and is fixed such that an outer peripheral surface thereof is in close contact with an inner peripheral surface of the motor housing 21. The stator coil 32 is accommodated inside the stator iron core 31.

The rotary shaft 12 is disposed inside the housing 11. The rotary shaft 12 is disposed along an axial center O concentric with the housing 11, and is rotatably supported by the housing 11 around the axial center O. The rotor 14 is fixed to an outer peripheral portion of the rotary shaft 12 at an intermediate position in the axial direction. The rotor 14 has a rotor iron core (permanent magnet) 33 and a holding sleeve 34. The rotor iron core 33 has a cylindrical shape and is disposed on an outer peripheral surface of the rotary shaft 12. The holding sleeve 34 has a cylindrical shape and is disposed on an outer side of the rotor iron core 33.

In the stator 13 and the rotor 14, an inner peripheral surface and an outer peripheral surface face each other in a radial direction. A gap is provided between the inner peripheral surface and the outer peripheral surface of the stator 13 and the rotor 14. Therefore, when a current flows through the stator coil 32 of the stator 13, the rotor 14 rotates due to attraction and repulsion of magnetic forces generated, and the rotary shaft 12 outputs a rotational force.

The rotary shaft 12 is rotatably supported by a low-pressure side air bearing 35 and a high-pressure side air bearing 36. The rotary shaft 12 is provided with a low-pressure side shaft portion **12*a* on one side in the axial direction with respect to the rotor 14, and is provided with a high-pressure side shaft portion 12*b* on the other side in the axial direction with respect to the rotor 14. In the rotary shaft 12, a low-pressure side bearing sleeve (bearing sleeve for an air bearing) 37 is mounted on the low-pressure side shaft portion 12*a* in an integrally rotatable manner, and a high-pressure side bearing sleeve (bearing sleeve for an air bearing) 38 is mounted on the high-pressure side shaft portion 12*b* in an integrally rotatable manner. The low-pressure side bearing sleeve 37 functions as a low-pressure side shaft portion, and the high-pressure side bearing sleeve 38** functions as a high-pressure side shaft portion.

The low-pressure side air bearing 35 is provided integrally with the low-pressure side bearing housing 22. The low-pressure side air bearing 35 has a cylindrical shape and is formed to extend from an inner surface of the low-pressure side bearing housing 22 to a rotor 14 side. The low-pressure side air bearing 35 is disposed outside the low-pressure side bearing sleeve 37 mounted on the rotary shaft 12. When the rotary shaft 12 rotates, a low-pressure side gap is ensured between an inner peripheral surface of the low-pressure side air bearing 35 and an outer peripheral surface of the low-pressure side bearing sleeve 37.

The high-pressure side air bearing 36 is provided integrally with the high-pressure side bearing housing 23. The high-pressure side air bearing 36 has a cylindrical shape and is formed to extend from an inner surface of the high-pressure side bearing housing 23 to the rotor 14 side. The high-pressure side air bearing 36 is disposed outside the high-pressure side bearing sleeve 38 mounted on the rotary shaft 12. When the rotary shaft 12 rotates, a high-pressure side gap is ensured between an inner peripheral surface of the high-pressure side air bearing 36 and an outer peripheral surface of the high-pressure side bearing sleeve 38.

In the rotary shaft 12, a thrust disk 39 that constitutes a thrust bearing is fixed on one side in the axial direction, and a low-pressure side thrust sleeve 40 is disposed. The thrust disk 39 is fixed between the low-pressure side bearing sleeve 37 and the low-pressure wheel 15 in the rotary shaft 12. The thrust disk 39 rotates integrally with the rotary shaft 12. The low-pressure side bearing housing 22 is provided with a low-pressure side space 41 on an outer circumferential edge of the axial center O. The thrust disk 39 is disposed in the low-pressure side space 41. The low-pressure side space 41 communicates with the low-pressure side gap between the inner peripheral surface of the low-pressure side air bearing 35 and the outer peripheral surface of the low-pressure side bearing sleeve 37. The low-pressure side thrust sleeve 40 is disposed between the low-pressure wheel 15 and the thrust disk 39 in the rotary shaft 12. The low-pressure side thrust sleeve 40 rotates integrally with the rotary shaft 12. A seal member (not shown) is provided on an outer peripheral portion of the low-pressure side thrust sleeve 40. An outer peripheral portion of the seal member comes into contact with an inner peripheral surface of the low-pressure side bearing housing 22. The low-pressure side thrust sleeve 40 is rotatable relative to the low-pressure side bearing housing 22.

In the rotary shaft 12, a high-pressure side thrust sleeve 42 is disposed on the other side in the axial direction. The high-pressure side thrust sleeve 42 is disposed between the high-pressure wheel 16 and the high-pressure side bearing sleeve 38 in the rotary shaft 12. The high-pressure side thrust sleeve 42 rotates integrally with the rotary shaft 12. A seal member (not shown) is provided on an outer peripheral portion of the high-pressure side thrust sleeve 42. An outer peripheral portion of the seal member comes into contact with an inner peripheral surface of the high-pressure side bearing housing 23. The high-pressure side thrust sleeve 42 is rotatable relative to the high-pressure side bearing housing 23.

In the housing 11, a low-pressure compressor 51 is disposed on a low-pressure side bearing housing 22 side, and a high-pressure compressor 61 is disposed on a high-pressure side bearing housing 23 side. The low-pressure compressor 51 has a low-pressure side housing 52 and the low-pressure wheel 15. The high-pressure compressor 61 has a high-pressure side housing 62 and the high-pressure wheel 16.

The low-pressure side housing 52 is fastened to an outer surface of the low-pressure side bearing housing 22 by a plurality of bolts. The low-pressure wheel 15 is disposed inside the low-pressure side housing 52. The low-pressure wheel 15 is fixed to one end portion of the rotary shaft 12 in the axial direction by a nut 53 in an integrally rotatable manner. The low-pressure compressor 51 is provided with an intake port 54, a diffuser 55, a scroll part 56 having a spiral shape, and a discharge port (not shown) by means of the low-pressure side housing 52 and the low-pressure wheel 15.

The high-pressure side housing 62 is fastened to an outer surface of the high-pressure side bearing housing 23 by a plurality of bolts. The high-pressure wheel 16 is disposed inside the high-pressure side housing 62. The high-pressure wheel 16 is fixed to the other end portion of the rotary shaft 12 in the axial direction by a nut 63 in an integrally rotatable manner. The high-pressure compressor 61 is provided with an intake port 64, a diffuser 65, a scroll part 66 having a spiral shape, and a discharge port (not shown) by means of the high-pressure side housing 62 and the high-pressure wheel 16.

In addition, the discharge port (not shown) and the intake port 64 of the low-pressure compressor 51 and of the high-pressure compressor 61 are connected by a connection flow path 71.

In the low-pressure compressor 51, when the low-pressure wheel 15 rotates, external air is taken in through the intake port 54 and is accelerated by a centrifugal force of the low-pressure wheel 15. The accelerated air is decelerated and pressurized by the diffuser 55, then flows through the scroll part 56, and is discharged from the discharge port. The low-pressure air compressed by the low-pressure compressor 51 is fed to the high-pressure compressor 61 by the connection flow path 71. In the high-pressure compressor 61, when the high-pressure wheel 16 rotates, the external air is taken in through the intake port 64 and is accelerated by a centrifugal force of the high-pressure wheel 16. The accelerated air is decelerated and pressurized by the diffuser 65, then flows through the scroll part 66, and is discharged from the discharge port.

In addition, the housing 11 is provided with a low-pressure side air flow path 72 and a high-pressure side air flow path 73. The low-pressure side air flow path 72 supplies the compressed air from the housing 11 to the low-pressure side air bearing 35. The low-pressure side air flow path 72 is provided to branch from the connection flow path 71, and supplies a portion of the compressed air to the low-pressure side space 41. Then, the compressed air in the low-pressure side space 41 is supplied to the low-pressure side gap between the inner peripheral surface of the low-pressure side air bearing 35 and the outer peripheral surface of the low-pressure side bearing sleeve 37 to support the rotary shaft 12 at a predetermined position in the radial direction. Thereafter, the compressed air supplied to the low-pressure side air bearing 35 flows into a gap between the stator 13 and the rotor 14.

The high-pressure side air flow path 73 supplies the compressed air from the housing 11 to the high-pressure side air bearing 36. The high-pressure side air flow path 73 is provided to branch from the connection flow path 71, and supplies a portion of the compressed air to the high-pressure side air bearing 36. The compressed air is supplied to the high-pressure gap between the inner peripheral surface of the high-pressure side air bearing 36 and the outer peripheral surface of the high-pressure side bearing sleeve 38 to support the rotary shaft 12 at a predetermined position in the radial direction. Thereafter, the compressed air supplied to the high-pressure side air bearing 36 flows into the gap between the stator 13 and the rotor 14.

<Rotating Body>

Figure 2:
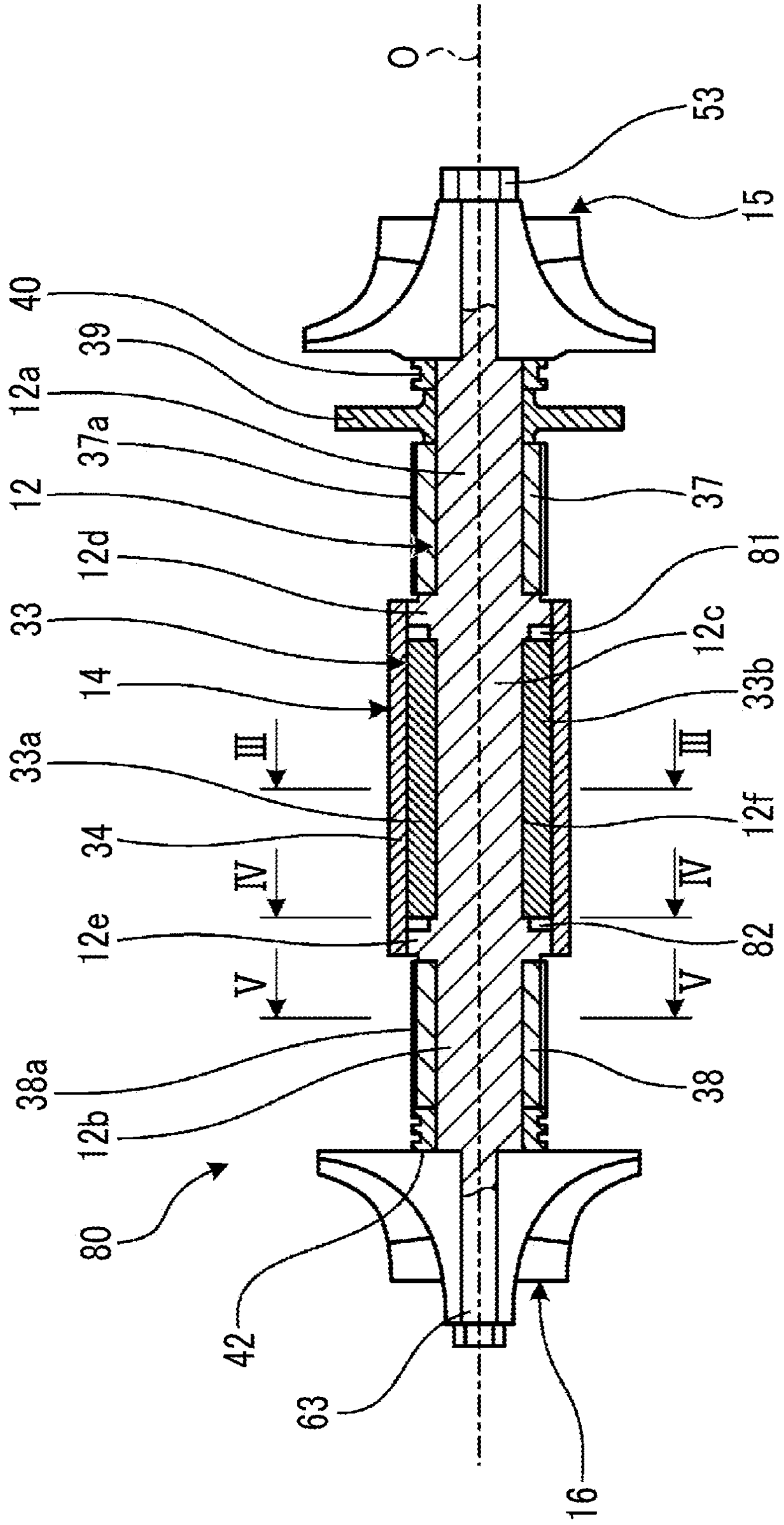
FIG. 2 is a longitudinal sectional view showing a rotating body of the present embodiment.
Figure 3:
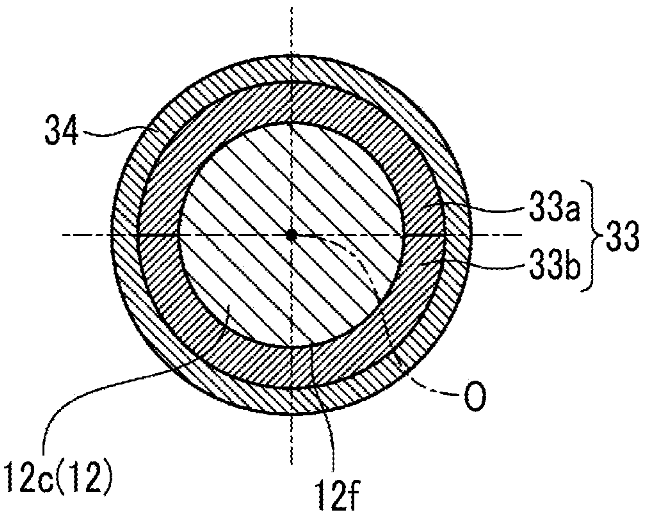
FIG. 3 is a cross-sectional view taken along line III-III of FIG. 2 showing a relationship between a rotary shaft, a rotor iron core, and a holding sleeve.
Figure 4:
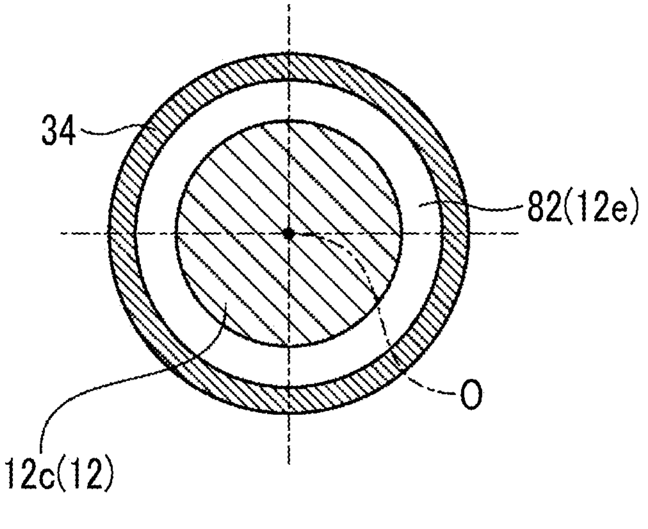
FIG. 4 is a cross-sectional view taken along line IV-IV of FIG. 2 showing a relationship between the rotary shaft and the holding sleeve.
Figure 5:
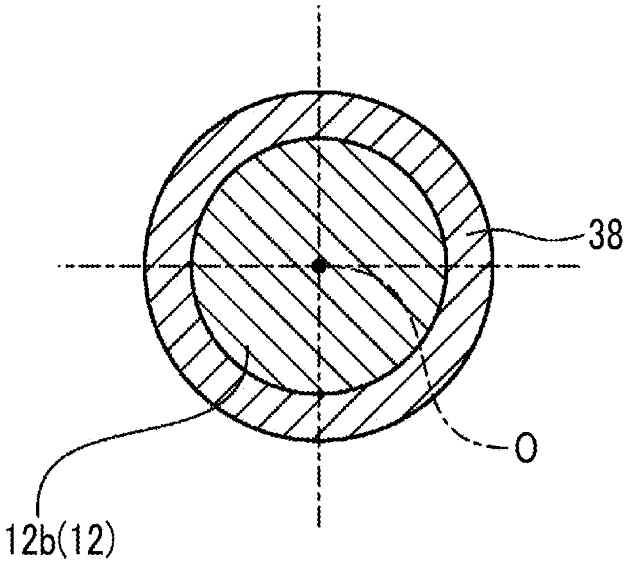
FIG. 5 is a cross-sectional view taken along line V-V of FIG. 2 showing a relationship between the rotary shaft and a bearing sleeve.

FIG. 2 is a longitudinal sectional view showing the rotating body of the present embodiment, FIG. 3 is a cross-sectional view taken along line III-III of FIG. 2 showing a relationship between the rotary shaft, the rotor iron core, and the holding sleeve, FIG. 4 is a cross-sectional view taken along line IV-IV of FIG. 2 showing a relationship between the rotary shaft and the holding sleeve, and FIG. 5 is a cross-sectional view taken along line V-V of FIG. 2 showing a relationship between the rotary shaft and the bearing sleeve.

As shown in FIG. 2, a rotating body 80 has the rotary shaft 12 and the rotor 14. The rotor 14 has the rotor iron core 33 and the holding sleeve 34. The rotor iron core 33 is a permanent magnet having a cylindrical shape, and is disposed on the outer peripheral surface of the rotary shaft 12. The holding sleeve 34 has a cylindrical shape and is disposed on the outer side of the rotor iron core 33.

The rotary shaft 12 is a magnetic body having the axial center O. The rotary shaft 12 has the low-pressure side shaft portion 12*a*, the high-pressure side shaft portion 12*b*, and an intermediate shaft portion 12*c*. The low-pressure side shaft portion 12*a* is located on one side in the axial direction of the rotary shaft 12. The high-pressure side shaft portion 12*b* is located on the other side in the axial direction of the rotary shaft 12. The intermediate shaft portion 12*c* is an intermediate portion in the axial direction of the rotary shaft 12, and is located between the low-pressure side shaft portion 12*a* and the high-pressure side shaft portion 12*b*. In addition, the rotary shaft 12 is provided with a low-pressure side flange portion 12*d* between the low-pressure side shaft portion 12*a* and the intermediate shaft portion 12*c*. The rotary shaft 12 is provided with a high-pressure side flange portion 12*e* between the high-pressure side shaft portion 12*b* and the intermediate shaft portion 12*c*. The low-pressure side flange portion 12*d* and the high-pressure side flange portion 12*e* are provided at an interval in the axial direction of the rotary shaft 12. The low-pressure side flange portion 12*d* and the high-pressure side flange portion 12*e* have the same outer diameter.

In addition, the rotary shaft 12 is provided with an axial recessed portion 12*f* in an outer peripheral portion of the intermediate shaft portion 12*c*. The axial recessed portion 12*f* has a shape recessed between the low-pressure side flange portion 12*d* and the high-pressure side flange portion 12*e* along a circumferential direction toward an axial center O side.

As shown in FIGS. 2 and 3, the rotor iron core 33 is disposed on an outer side of the intermediate shaft portion 12*c* in the rotary shaft 12. The rotor iron core 33 has a plurality of (two in the present embodiment) divided iron cores 33*a* and 33*b* divided in the circumferential direction. The divided iron cores 33*a* and 33*b* may be integrally formed or may be divided into a plurality of pieces in the axial direction. In addition, the divided iron cores 33*a* and 33*b* may be made of a laminated steel plate. The number of divided iron cores 33*a* and 33*b* may be three or more.

The divided iron cores 33*a* and 33*b* are mounted on an outer peripheral surface of the intermediate shaft portion 12*c* in the rotary shaft 12. At this time, the divided iron cores 33*a* and 33*b* are positioned in the axial direction by being fitted to the axial recessed portion 12*f* of which an inner peripheral portion is formed in the intermediate shaft portion 12*c*. At this time, inner peripheral surfaces of the divided iron cores 33*a* and 33*b* are bonded to an outer peripheral surface of the axial recessed portion 12*f*. Therefore, the divided iron cores 33*a* and 33*b* are mounted on the intermediate shaft portion 12*c* between the low-pressure side flange portion 12*d* and the high-pressure side flange portion 12*e*. An outer diameter of the rotor iron core 33 is the same as or slightly smaller than the outer diameters of the low-pressure side flange portion 12*d* and the high-pressure side flange portion 12*e*.

The holding sleeve 34 is disposed on the outer side of the rotor iron core 33. The holding sleeve 34 is located on the outer side of the rotor iron core 33, and has one end portion in the axial direction fixed to an outer peripheral portion of the low-pressure side flange portion 12*d*, and the other end portion fixed to an outer peripheral portion of the high-pressure side flange portion 12*e*. The outer peripheral portions of the low-pressure side flange portion 12*d* and the high-pressure side flange portion 12*e* are inserted into the holding sleeve 34 from one side in the axial direction of the rotary shaft 12. The holding sleeve 34 is fixed to outer peripheral surfaces of the low-pressure side flange portion 12*d*, the rotor iron core 33, and the high-pressure side flange portion 12*e* via shrink fitting. Therefore, an inner peripheral surface of the holding sleeve 34 comes in close contact with the outer peripheral surface of the low-pressure side flange portion 12*d*, the outer peripheral surface of the high-pressure side flange portion 12*e*, and the outer peripheral surface of the rotor iron core 33.

Then, as shown in FIGS. 2 and 4, the rotor iron core 33 is disposed such that end portions thereof are separated from the low-pressure side flange portion 12*d* and the high-pressure side flange portion 12*e* by a predetermined interval set in advance in the axial direction of the rotary shaft 12. Therefore, a low-pressure side space 81 is provided between the rotor iron core 33 and the low-pressure side flange portion 12*d*, and a high-pressure side space 82 is provided between the rotor iron core 33 and the high-pressure side flange portion 12*e*. The low-pressure side space 81 is defined by one end surface of the rotor iron core 33 in the axial direction, an outer surface of the intermediate shaft portion 12*c*, one side surface of the low-pressure side flange portion 12*d*, and an inner surface of the holding sleeve 34. The high-pressure side space 82 is defined by the other end surface of the rotor iron core 33 in the axial direction, the outer surface of the intermediate shaft portion 12*c*, one side surface of the high-pressure side flange portion 12*e*, and the inner surface of the holding sleeve 34.

The low-pressure side space 81 and the high-pressure side space 82 are nonmagnetic bodies. Therefore, the low-pressure side space 81 and the high-pressure side space 82 may be filled with a resin material that is a nonmagnetic body. A strength of the rotor iron core 33 can be increased by filling the low-pressure side space 81 and the high-pressure side space 82 with the resin material.

As shown in FIGS. 1 and 5, the rotary shaft 12 has the low-pressure side bearing sleeve 37 fixed to the low-pressure side shaft portion 12*a*. The low-pressure side bearing sleeve 37 has a cylindrical shape and is lightly press-fitted (fitted with a gap) to the low-pressure side shaft portion 12*a*. The light press fitting is performed by press-fitting the low-pressure side bearing sleeve 37 with a pressure for moving the low-pressure side bearing sleeve 37 in the axial direction with respect to the rotary shaft 12 when a predetermined stress is applied to the low-pressure side bearing sleeve 37 in the axial direction. Therefore, the low-pressure side bearing sleeve 37 is rotatable integrally with the rotary shaft 12.

The rotary shaft 12 has the high-pressure side bearing sleeve 38 fixed to the high-pressure side shaft portion 12*b*. The high-pressure side bearing sleeve 38 has a cylindrical shape and is lightly press-fitted (fitted with a gap) to the high-pressure side shaft portion 12*b*. Therefore, the high-pressure side bearing sleeve 38 is rotatable integrally with the rotary shaft 12.

The low-pressure side bearing sleeve 37 is provided with a wear-resistant coating layer 37*a* by applying a wear-resistant coating on the outer peripheral surface. The high-pressure side bearing sleeve 38 is provided with a wear-resistant coating layer 38*a* by applying a wear-resistant coating on the outer peripheral surface. The wear-resistant coating on the low-pressure side bearing sleeve 37 and the wear-resistant coating on the high-pressure side bearing sleeve 38 are applied before assembly to the rotary shaft 12.

On one side in the axial direction of the rotary shaft 12, the thrust disk 39 is inserted adjacent to the low-pressure side bearing sleeve 37, and the low-pressure side thrust sleeve 40 is inserted. Then, the low-pressure wheel 15 is mounted to one end portion of the rotary shaft 12 in the axial direction, and is fastened by the nut 53 in an integrally rotatable manner. At this time, the low-pressure wheel 15 is pressed toward a stator 13 side by a fastening strength of the nut 53 with respect to the rotary shaft 12. Then, a pressing force of the low-pressure wheel 15 is transmitted to the low-pressure side bearing sleeve 37 via the low-pressure side thrust sleeve 40 and the thrust disk 39, and the low-pressure side bearing sleeve 37 abuts against the low-pressure side flange portion 12*d* to be positioned.

On the other side in the axial direction of the rotary shaft 12, the high-pressure side thrust sleeve 42 is inserted adjacent to the high-pressure side bearing sleeve 38. Then, the high-pressure wheel 16 is mounted to the other end portion of the rotary shaft 12 in the axial direction, and is fastened by the nut 63 in an integrally rotatable manner. At this time, the high-pressure wheel 16 is pressed toward the stator 13 side by a fastening strength of the nut 63 with respect to the rotary shaft 12. Then, a pressing force of the high-pressure wheel 16 is transmitted to the high-pressure side bearing sleeve 38 via the high-pressure side thrust sleeve 42, and the high-pressure side bearing sleeve 38 abuts against the high-pressure side flange portion 12*e* to be positioned.

<Method of Assembling Rotating Body>

Figure 6:
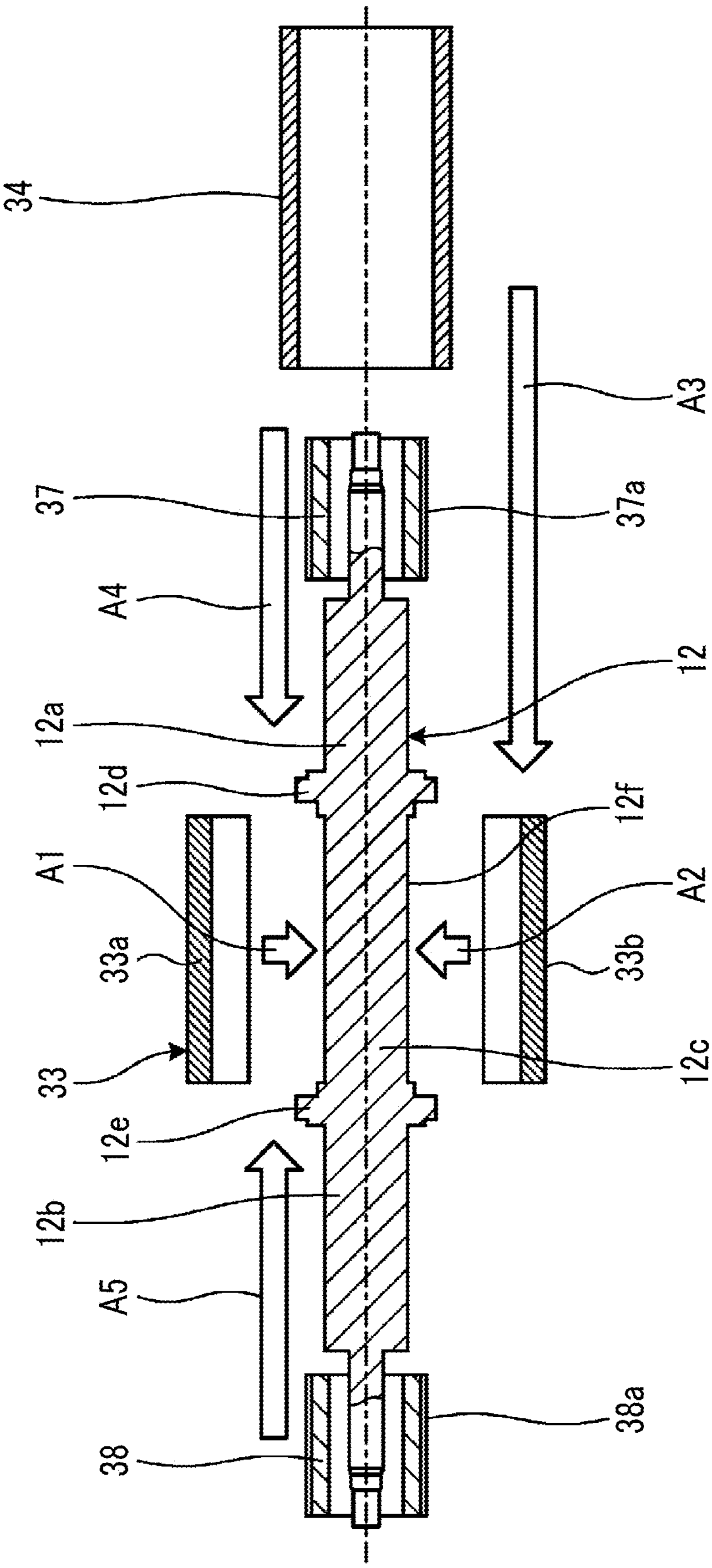
FIG. 6 is an exploded sectional view for describing a method of assembling a rotating body.

FIG. 6 is an exploded sectional view for describing a method of assembling the rotating body.

As shown in FIG. 6, the rotary shaft 12 has the low-pressure side flange portion 12*d* and the high-pressure side flange portion 12*e*. The rotor iron core 33 is constituted by the two divided iron cores 33*a* and 33*b*. First, the divided iron cores 33*a* and 33*b* are located outside the intermediate shaft portion 12*c* of the rotary shaft 12 in the radial direction, and the divided iron cores 33*a* and 33*b* are moved in arrow A1 and A2 directions, which are directed inward in the radial direction of the rotary shaft 12, to be brought into close contact with the intermediate shaft portion 12*c*.

At this time, inner peripheral portions of the divided iron cores 33*a* and 33*b* are positioned in the axial recessed portion 12*f* of the intermediate shaft portion 12*c*, and inner peripheral surfaces thereof are bonded to the axial recessed portion 12*f*. Therefore, the rotor iron core 33 is disposed such that one end portion in the axial direction is separated from the low-pressure side flange portion 12*d* by a predetermined interval, and the other end portion in the axial direction is separated from the high-pressure side flange portion 12*e* by a predetermined interval.

Next, the holding sleeve 34 is located on one side in the axial direction with respect to the rotary shaft 12, and the holding sleeve 34 is moved in an arrow A3 direction, which is the other side in the axial direction of the rotary shaft 12, to be disposed outside the low-pressure side flange portion 12*d*, the rotor iron core 33, and the high-pressure side flange portion 12*e* in the radial direction. At this time, the holding sleeve 34 is fixed to the low-pressure side flange portion 12*d*, the rotor iron core 33, and the high-pressure side flange portion 12*e* via shrink fitting. That is, the holding sleeve 34 is expanded and widened in inner diameter by being heated, and in this state, the holding sleeve 34 is located outside the low-pressure side flange portion 12*d*, the rotor iron core 33, and the high-pressure side flange portion 12*e*. Thereafter, the holding sleeve 34 is cooled to shrink and reduce in inner diameter, and the inner peripheral surface of the holding sleeve 34 presses the outer peripheral surfaces of the low-pressure side flange portion 12*d*, the rotor iron core 33, and the high-pressure side flange portion 12*e*.

Therefore, the holding sleeve 34 is in a fixed state of being firmly joined to the low-pressure side flange portion 12*d*, the rotor iron core 33, and the high-pressure side flange portion 12*e*. That is, the rotary shaft 12, the rotor iron core 33, and the holding sleeve 34 are integrally joined. At this time, the low-pressure side space 81 is formed between the rotor iron core 33 and the low-pressure side flange portion 12*d*, and the high-pressure side space 82 is formed between the rotor iron core 33 and the high-pressure side flange portion 12*e*.

Subsequently, the low-pressure side bearing sleeve 37 is located on one side in the axial direction with respect to the rotary shaft 12, and the low-pressure side bearing sleeve 37 is moved in an arrow A4 direction, which is the other side in the axial direction of the rotary shaft 12, to be lightly press-fitted to the low-pressure side shaft portion 12*a*. In addition, the high-pressure side bearing sleeve 38 is located on the other side in the axial direction with respect to the rotary shaft 12, and the high-pressure side bearing sleeve 38 is moved in an arrow A5 direction, which is one side in the axial direction of the rotary shaft 12, to be lightly press-fitted to the high-pressure side shaft portion 12*b*. In this case, since the wear-resistant coating is applied to each of the outer peripheral surfaces of the low-pressure side bearing sleeve 37 and the high-pressure side bearing sleeve 38 before assembly, the low-pressure side bearing sleeve 37 and the high-pressure side bearing sleeve 38 are respectively provided with the wear-resistant coating layers 37*a* and 38*a*.

Then, as shown in FIG. 2, after the thrust disk 39 and the low-pressure side thrust sleeve 40 are inserted into one end portion of the rotary shaft 12, the low-pressure wheel 15 is mounted and fastened by the nut 53. In addition, after the high-pressure side thrust sleeve 42 is inserted into the other end portion of the rotary shaft 12, the high-pressure wheel 16 is mounted and fastened by the nut 63.

<Operation of Electric Compressor>

In the electric compressor 10, when a current (AC voltage) flows through the stator coil 32 included in the stator 13, a magnetic field is generated around the stator 13, a rotating magnetic field (magnetic force) is generated, and an N pole and an S pole are generated around the stator 13. The rotor iron core 33 (rotor 14) is rotated by being attracted by the rotating magnetic field of the stator 13. At this time, the rotor iron core 33 is a magnetic body, and a magnetic flux along the circumferential direction is generated. Then, the low-pressure side space 81 is formed on one side in the axial direction in the rotor iron core 33, and the high-pressure side space 82 is formed on the other side. Since the low-pressure side space 81 and the high-pressure side space 82 are nonmagnetic bodies, leakage of the magnetic flux in the axial direction in the rotor iron core 33 is prevented. In a case where the low-pressure side space 81 and the high-pressure side space 82 are filled with the resin material, the strength of the rotor iron core 33 is increased.

The low-pressure side flange portion 12*d* and the high-pressure side flange portion 12*e* of the rotary shaft 12 have higher rigidity than the rotor iron core 33. Therefore, when the holding sleeve 34 fixes the rotor iron core 33 to the rotary shaft 12 via shrink fitting, an intermediate portion of the holding sleeve 34 in the axial direction deforms toward the axial center O side and presses the rotor iron core 33, so that a contact area between the rotary shaft 12 and the rotor iron core 33 and the holding sleeve 34 is increased, which increases the strength against the centrifugal force.

In addition, the rotary shaft 12 is a magnetic body, and the magnetic flux of the rotor iron core 33 flows through the rotary shaft 12. Then, a rotational force of the rotor iron core 33 is transmitted to the holding sleeve 34 via a surface contact portion of an outer peripheral portion of the rotor iron core 33, and is further transmitted to the rotary shaft 12 via a surface contact between the holding sleeve 34 and the low-pressure side flange portion 12*d* and the high-pressure side flange portion 12*e*. When the rotary shaft 12 rotates, the low-pressure wheel 15 and the high-pressure wheel 16 connected to the respective end portions rotate to compress the air.

Effect of Action of Present Embodiment

The rotating body according to a first aspect includes: the rotary shaft 12 having the pair of flange portions 12*d* and 12*e* provided at an interval in the axial direction; the rotor iron core 33 made of the magnet that has a cylindrical shape, that is divided into a plurality of pieces in the circumferential direction, and that is disposed between the pair of flange portions 12*d* and 12*e* on an outer side of the rotary shaft 12 in the radial direction; and the holding sleeve 34 that has a cylindrical shape, is disposed on the outer side of the rotor iron core 33, and has one end portion and the other end portion in the axial direction fixed to the outer peripheral portions of the pair of flange portions 12*d* and 12*e*.

According to the rotating body according to the first aspect, since the rotary shaft 12 is provided with the pair of flange portions 12*d* and 12*e*, the rotating body 80 can be easily assembled by disposing the holding sleeve 34 on the outer side of the rotor iron core 33 and fixing the holding sleeve 34 to the pair of flange portions 12*d* and 12*e* after assembling the rotor iron core 33 to the rotary shaft 12. That is, the work of fixing a pair of end plates (the pair of flange portions 12*d* and 12*e*) for fixing the holding sleeve 34 to the rotary shaft 12 is not required. As a result, the number of parts can be reduced, and the assembly work can be simplified.

In the rotating body according to a second aspect, the holding sleeve 34 is fixed to the outer peripheral surfaces of the pair of flange portions 12*d* and 12*e* and to the outer peripheral surface of the rotor iron core 33 via shrink fitting. Accordingly, the rotary shaft 12, the rotor iron core 33, and the holding sleeve 34 can be integrally joined, and the assembly work can be simplified. In addition, a compressive load is applied to the rotor iron core 33 by the holding sleeve 34, which suppresses damage due to a centrifugal force acting on the rotor iron core 33 during rotation.

In the rotating body according to a third aspect, the pair of flange portions 12*d* and 12*e* and the rotor iron core 33 are disposed to be separated from each other by a predetermined interval set in advance in the axial direction of the rotary shaft 12. Accordingly, the low-pressure side space 81, which is a nonmagnetic body, is formed on one side in the axial direction in the rotor iron core 33, and the high-pressure side space 82, which is a nonmagnetic body, is formed on the other side in the axial direction. Therefore, it is possible to prevent leakage of the magnetic flux formed in the rotor iron core 33, which is a magnetic body, in the axial direction, and it is possible to suppress a decrease in efficiency.

In the rotating body according to a fourth aspect, the resin material (nonmagnetic body) is disposed between the pair of flange portions 12*d* and 12*e* and the rotor iron core 33. Accordingly, the resin material (nonmagnetic body) is disposed in the low-pressure side space 81 on one side in the axial direction in the rotor iron core 33, and the resin material (nonmagnetic body) is disposed in the high-pressure side space 82 on the other side. Therefore, it is possible to prevent leakage of the magnetic flux formed in the rotor iron core 33, which is a magnetic body, in the axial direction, and it is possible to suppress a decrease in efficiency. In addition, the strength of the rotor iron core 33 can be increased by eliminating the spaces.

In the rotating body according to a fifth aspect, the rotary shaft 12 is provided with the axial recessed portion 12*f* that is recessed between the pair of flange portions 12*d* and 12*e* along the circumferential direction toward the axial center O side, and the stator iron core is positioned in the axial recessed portion 12*f*. Accordingly, the divided iron cores 33*a* and 33*b* can be positioned at appropriate positions in the axial direction with respect to the rotary shaft 12, the low-pressure side space 81 can be appropriately formed on one side in the axial direction in the rotor iron core 33, and the high-pressure side space 82 can be appropriately formed on the other side in the axial direction.

In the rotating body according to a sixth aspect, the inner peripheral surface of the rotor iron core 33 is bonded to the outer peripheral surface of the rotary shaft 12. Accordingly, the divided iron cores 33*a* and 33*b* can be easily mounted on the rotary shaft 12.

The rotating electric machine according to a seventh aspect includes: the housing 11 having a hollow shape; the stator 13 that has a cylindrical shape and that is fixed to the inner peripheral surface of the housing 11; and the rotating body 80 that is rotatably supported by the housing 11 such that the rotor 14 having the rotor iron core 33 faces the inner peripheral surface of the stator 13 with a gap therebetween. Accordingly, the number of parts can be reduced, and the assembly work can be simplified.

The electric compressor according to an eighth aspect includes: the rotating electric machine; the low-pressure wheel 15 that is fixed to one side of the rotary shaft 12 in the axial direction; and the high-pressure wheel 16 that is fixed to the other side of the rotary shaft 12 in the axial direction. Accordingly, the number of parts can be reduced, and the assembly work can be simplified.

The method of manufacturing a rotating body according to a ninth aspect includes: a step of forming the rotor iron core 33 having a cylindrical shape by assembling the plurality of divided iron core 33*a* and 33*b* divided in the circumferential direction, between the pair of flange portions 12*d* and 12*e* provided at an interval in the axial direction of the rotary shaft 12 from an outer side in the radial direction; and a step of inserting the holding sleeve 34 having a cylindrical shape from one side in the axial direction of the rotary shaft 12, disposing the holding sleeve 34 on the outer side of the rotor iron core 33, and fixing the holding sleeve 34 to the outer peripheral portions of the pair of flange portions 12*d* and 12*e*. Accordingly, the rotating body 80 can be easily assembled, the number of parts can be reduced, and the assembly work can be simplified.

REFERENCE SIGNS LIST

10: Electric compressor
11: Housing
12: Rotary shaft
12*a*: Low-pressure side shaft portion
12*b*: High-pressure side shaft portion
12*c*: Intermediate shaft portion
12*d*: Low-pressure side flange portion
12*e*: High-pressure side flange portion
12*f*: Axial recessed portion
13: Stator
14: Rotor
15: Low-pressure wheel
16: High-pressure wheel
21: Motor housing
22: Low-pressure side bearing housing
23: High-pressure side bearing housing
31: Stator iron core
32: Stator coil
33: Rotor iron core
33*a*, 33*b*: Divided iron core
34: Holding sleeve
35: Low-pressure side air bearing
36: High-pressure side air bearing
37: Low-pressure side bearing sleeve (bearing sleeve for an air bearing)
37*a*: Wear-resistant coating layer
38: High-pressure side bearing sleeve (bearing sleeve for an air bearing)
38*a*: Wear-resistant coating layer
39: Thrust disk
40: Low-pressure side thrust sleeve
41: Low-pressure side space
42: High-pressure side thrust sleeve
51: Low-pressure compressor
52: Low-pressure side housing
53, 63: Nut
54, 64: Intake port
55, 65: Diffuser

56, 66: Scroll part
61: High-pressure compressor
62: High-pressure side housing
71: Connection flow path
72: Low-pressure side air flow path
73: High-pressure side air flow path
80 Rotating body
81: Low-pressure side space
82: High-pressure side space

The invention claimed is:

1. A rotating body comprising:
a rotary shaft having a pair of flange portions provided at an interval in an axial direction;
an iron core made of a magnet that has a cylindrical shape, that is divided into a plurality of pieces in a circumferential direction, and that is disposed between the pair of flange portions on an outer side of the rotary shaft in a radial direction; and
a holding sleeve that has a cylindrical shape, is disposed on an outer side of the iron core, and has one end portion and the other end portion in the axial direction fixed to outer peripheral portions of the pair of flange portions,
wherein an outer diameter of the iron core is smaller than outer diameters of the pair of flange portions, and the iron core is bonded to an outer peripheral surface of the rotary shaft,
wherein an inner peripheral surface of the holding sleeve closely contacts with outer peripheral surfaces of the pair of flange portions.

2. The rotating body according to claim 1,
wherein the pair of flange portions and the iron core are disposed to be separated from each other by a predetermined interval set in advance in the axial direction of the rotary shaft.

3. The rotating body according to claim 2,
wherein the rotary shaft is provided with an axial recessed portion that is recessed between the pair of flange portions along the axial direction toward an axial center side, and the iron core is positioned in the axial recessed portion.

4. The rotating body according to claim 2,
wherein an inner peripheral surface of the iron core is bonded to an outer peripheral surface of the rotary shaft.

5. A rotating electric machine comprising:
a housing having a hollow shape;
a stator that has a cylindrical shape and that is fixed to an inner peripheral surface of the housing; and
the rotating body according to claim 2 that is rotatably supported by the housing such that the rotor having the iron core faces an inner peripheral surface of the stator with a gap therebetween.

6. The rotating body according to claim 1,
wherein a nonmagnetic body is disposed between the pair of flange portions and the iron core.

7. The rotating body according to claim 6,
wherein the rotary shaft is provided with an axial recessed portion that is recessed between the pair of flange portions along the axial direction toward an axial center side, and the iron core is positioned in the axial recessed portion.

8. The rotating body according to claim 6,
wherein an inner peripheral surface of the iron core is bonded to an outer peripheral surface of the rotary shaft.

9. The rotating body according to claim 1,
wherein the rotary shaft is provided with an axial recessed portion that is recessed between the pair of flange portions along the axial direction toward an axial center side, and the iron core is positioned in the axial recessed portion.

10. The rotating body according to claim 2,
wherein an inner peripheral surface of the iron core is bonded to an outer peripheral surface of the rotary shaft.

11. A rotating electric machine comprising:
a housing having a hollow shape;
a stator that has a cylindrical shape and that is fixed to an inner peripheral surface of the housing; and
the rotating body according to claim 1 that is rotatably supported by the housing such that the rotor having the iron core faces an inner peripheral surface of the stator with a gap therebetween.

12. An electric compressor comprising:
the rotating electric machine according to claim 11;
a low-pressure wheel that is fixed to one side of the rotary shaft in the axial direction; and
a high-pressure wheel that is fixed to the other side of the rotary shaft in the axial direction.

13. A method of manufacturing a rotating body, the method comprising:
a step of forming an iron core having a cylindrical shape by assembling a plurality of divided iron core divided in a circumferential direction, between a pair of flange portions provided at an interval in an axial direction of a rotary shaft from an outer side in a radial direction, wherein an outer diameter of the iron core is smaller than outer diameters of the pair of flange portions, and bonding the iron core to an outer peripheral surface of the rotary shaft; and
a step of inserting a holding sleeve having a cylindrical shape from one side in the axial direction of the rotary shaft, disposing the holding sleeve on outer peripheral surfaces of the pair of flange portions and an outer side of the iron core,
a step of closely contacting an inner peripheral surface of the holding sleeve with the outer peripheral surfaces of the pair of flange portions by fixing the holding sleeve to the outer peripheral surfaces of the pair of flange portions.

* * * * *